United States Patent [19]
Bishop et al.

[11] Patent Number: 5,093,386
[45] Date of Patent: Mar. 3, 1992

[54] LIQUID CURABLE PLASTIC COMPOSITION

[75] Inventors: Timothy E. Bishop, Algonquin, Ill.; Tohru Ohtaka Kawasaki; Osamu Ishikawa Sagamihara; Masanobu Takahashi; Katsutoshi Igarashi, Yokohama, all of Japan

[73] Assignee: Stamicarbon B.V., Netherlands

[21] Appl. No.: 664,491

[22] Filed: Mar. 5, 1991

Related U.S. Application Data

[63] Continuation of Ser. No. 352,273, May 16, 1989, abandoned.

[51] Int. Cl.$^5$ ................ C08L 75/08; C08L 75/16
[52] U.S. Cl. ............................ 522/96; 522/97; 522/103
[58] Field of Search .................... 522/96, 97

[56] References Cited

U.S. PATENT DOCUMENTS 4,744,827  5/1988  Winkel et al. ............. 522/96
4,843,111  6/1989  Yokoshima et al. ......... 522/96
4,844,604  7/1989  Bishop et al. ............. 522/97

Primary Examiner—Marion E. McCamish
Assistant Examiner—Susan Berman
Attorney, Agent, or Firm—Dressler, Goldsmith, Shore, Sutker & Milnamow, Ltd.

[57] ABSTRACT

A liquid photocurable plastic composition is disclosed which comprises:
- (a) from 14% to 70% by weight of a polyurethane (meth)acrylate having a polyoxyalkylene structure in the backbone of the polyurethane, said polyurethane (meth)acrylate containing 0.8 to 8 weight percent of ethylenic unsaturation, from 50% to 98% by weight of the polyoxyalkylene structure, and having a number average molecular weight of 1,000 to 7,000;
- (b) from 5% to 40% by weight of a polyurethane (meth)acrylate having at least 15% by weight of a tricyclodecane structure in the backbone of the polyurethane and a number average molecular weight of from 500 to 1,000;
- (c) a reactive diluent; and
- (d) a polymerization initiator. This combination provides a liquid curable plastic composition suitable as the secondary coating or bundling material for use with optical fibers to provide compositions which photocure rapidly to provide cured coatings which are relatively hard and elongatable and which can be applied at low viscosity without encountering excessive sensitivity to water.

10 Claims, No Drawings

LIQUID CURABLE PLASTIC COMPOSITION

This application is a continuation of application Ser. No. 07/352,273, filed May 16, 1989 now abandoned.

DESCRIPTION

1. Technical Field

The present invention relates to a liquid photocurable plastic composition suitable for use as a secondary coating for optical fibers or as a bundling material for uniting optical fibers into a composite form, such as a tape.

2. Background Art

In the manufacture of optical fiber a plastic coating is applied to the freshly formed glass fiber, e.g., the glass fiber immediately after it is melt-spun. The purpose is to protect and reinforce the fiber.

In usual practice, a flexible primary coating is first applied to the glass surface of the optical fiber, and this primary coating is followed by the application of a stronger and more rigid secondary coating, as is well known.

A number of the above plastic-coated optical fibers are then arranged in parallel to form a tape, and these parallel fibers are then coated with plastic to form a hardened tape.

The plastic composition used to form the primary coating is soft and can be referred to as the primary coating or as a soft coating. The plastic coating used to form the secondary coating is relatively hard and can be referred to as the secondary coating or as a hard coating. The plastic composition used to couple the coated fibers together to form a tape can be referred to as the bundling material.

The coating procedures conventionally used for the coating of optical glass fiber involve liquid compositions which cure on exposure to light, usually ultraviolet light. A photocure is usually used because it is far more rapid than a thermal cure.

Producers of optical glass fibers continually demand coatings which will cure more rapidly in order to keep up with the desire to increase the drawing speed of the fiber.

Urethane acrylates are commonly used in photocuring coating compositions intended for application to optical fiber. Urethane acrylates which are acrylate-terminated polyurethane oligomers based on polyethers are particularly desirable for use in optical fiber coating because they photocure more rapidly than other types of acrylate-terminated polyurethanes, such as those based on polyesters, polyolefins or polycarbonates. However, the viscosity of the acrylate-terminated polyurethane oligomers based on polyethers is too high and the Young's modulus of the cured material is rather low, so the polyether type of urethane acrylate is not favored for the production of secondary coatings or bundling material for optical glass fiber.

The viscosity is conventionally lowered by mixing a reactive diluent with the above polyether-based polyurethane acrylates to correct the excessive viscosity and enable easy application of the composition to the fiber. However, when, in order to obtain the desired curing speed, a large amount of a vinyl monomer, such as N-vinyl pyrrolidone or N-vinyl caprolactam, or the like, is added as a reactive diluent, the percentage of water absorption of the cured composition becomes too high, rendering the material unsuitable as the secondary coating or bundling material.

In addition, when a multifunctional acryl monomer with three or more functions is mixed in as a reactive diluent, the cure speed is elevated, and the Young's modulus of the cured material is raised. But when the addition is increased to the point where the desired cure speed and Young's modulus are obtained, the capacity of the cured composition to sustain elongation (its tenacity) is adversely affected.

An object of the present invention is to provide, with due consideration to the drawbacks of the conventional compositions as noted above, a liquid curable plastic composition suitable as the secondary coating or bundling material for use with optical fibers to provide compositions which photocure rapidly to provide cured coatings which are relatively hard and elongatable and which can be applied at low viscosity without encountering excessive sensitivity to water.

DISCLOSURE OF INVENTION

In accordance with this invention, we provide a liquid photocurable plastic composition comprising:
(a) a polyurethane (meth)acrylate having a polyoxyalkylene structure in the backbone of the polyurethane;
(b) a polyurethane (meth)acrylate having a tricyclodecane structure in the backbone of the polyurethane;
(c) a reactive diluent; an
(d) a polymerization initiator.

The urethane (meth)acrylate with a polyoxyalkylene structure, which is component (a) of the composition of the present invention (hereinafter referred to as urethane (meth)acrylate (a)) is obtained by reacting a diol having a polyoxyalkylene structure with polyisocyanate and a (meth)acrylate compound having a hydroxyl group.

Examples of methods for manufacturing the urethane (meth)acrylate (a) are outlined below.

Manufacturing method 1

This is a method by which a (meth)acrylate with a hydroxyl group is reacted with an isocyanate group of an intermediate obtained by reacting a diol having a polyoxyalkylene structure and diisocyanate.

Manufacturing method 2

This is a method by which a diol with a polyoxyalkylene structure is reacted with an isocyanate group of an addition product obtained by reacting a diisocyanate with a (meth)acrylate containing a hydroxyl group.

Manufacturing method 3

This is a method by which a diisocyanate, a diol with a polyoxyalkylene structure, and a (meth)acrylate with a hydroxyl group are reacted simultaneously.

Manufacturing method 4

This is a method by which a diol with a polyoxyalkylene structure is reacted with a compound having a (meth)acryloyl group and an isocyanate group in the same molecule.

Examples of diols with a polyoxyalkylene structure used in the abovementioned manufacturing methods 1 to 4 are, for example, polyethylene glycol, polypropylene glycol, polytetramethylene glycol, polyheptamethylene glycol, polyhexamethylene glycol, polydecamethylene glycol, polyether diol obtained by ring-opening copolymerization of at least two types of cyclic compounds which are ion-polymerizable.

Here, as ion-polymerizable cyclic compounds, there can be given cyclic ethers such as ethylene oxide, propylene oxide, butene-1-oxide, isobutene oxide, 3,3-bis-chloromethyloxetane, tetrahydrofuran, dioxane, trioxane, tetraoxane, 3-methyltetrahydrofuran, 2-methyltetrahydrofuran, cyclohexene oxide, styrene oxide, epichlorohydrin, glycidyl methacrylate, glycidyl acrylate, allylglycidyl ether, allylglycidyl carbonate, butadiene monoxide, isoprene monoxide, vinyloxetane, vinyl tetrahydrofuran, vinyl cyclohexene oxide, phenyl glycidyl ether, butyl glycidyl ether, benzoic acid glycidyl ester, and the like.

In addition, polyether diols obtained by the ring-opening copolymerization of the above-mentioned ion-polymerizable cyclic compound with a cyclic imine such as ethyl imine and the like, a cyclic lactone such as p-propiolactone, glycolic acid lactide and the like, or a cyclic siloxane such as dimethylcyclopolysiloxane and the like, can be used.

Further, as specific combinations of the above two or more types of ion-polymerizable cyclic compounds, there are tetrahydrofuran and propylene oxide, tetrahydrofuran and ethylene oxide, propylene oxide and ethylene oxide, 3-methyl-tetrahydrofuran and tetrahydrofuran, and the like.

Random linking of ring-opening copolymerization of two or more types of ion-polymerizable cyclic compounds is acceptable.

Furthermore, polyester diols obtained by reacting the previously mentioned diols having a polyoxyalkylene structure with dibasic acids such as phthalic acid, isophthalic acid, terephthalic acid, maleic acid, fumaric acid, adipic acid, sebacic acid, and the like, and polycaprolactone diols obtained by reacting the previously mentioned diols having a polyoxyalkylene structure with ε-caprolactone, and the like can also be used as diols with a polyoxyalkylene structure.

Further, diols with a polyoxyalkylene structure may be purchased on the market. Examples are PTMG 1000 (Mitsubishi Chemical Industries, Ltd.), PTMG 2000 (same), PPG 1000 (Asahi Oline Co., Ltd.), PPG 2000 (same), EXCENOL 2020 (same), EXCENOL 1020 (same), PEG 1000 (Nippon Oil and Fats), UNISAFE DC1100 (same), UNISAFE DC1800 (same), PPTG 2000 (Hodogaya Chemical Co.) PPTG 1000 (same), PTG 400 (same), PTG 3000 (same), PTGL 2000 (same), PTGL 3000 (same), and the like.

Diols with a polyoxyalkylene structure and diols and/or diamines without a polyoxyalkylene structure may be used together.

As diols without a polyoxyalkylene structure there are, for example, low molecular weight diols such as ethylene glycol, propylene glycol, tetramethylene glycol, 1,6-hexane diol, neopentyl glycol, 1,4-cyclohexane dimethanol, spiroglycol and the like; wolyesterdiols obtained by the reaction of such a low molecular weight diol and a dibasic acid such as phthalic acid, isophthalic acid, terephthalic acid, maleic acid, fumaric acid, adipic acid, sebacic acid, and the like; polycaprolactone diols obtained by reacting diols such as ethylene glycol, tetramethylene glycol, 1,6-hexane diol, neopentyl glycol, 1,4-cyclohexane dimethanol, 1,4-butane diol, and the like; and polycarbonate diols such as DN-980 (Nihon Polyurethane Co.), DN-981 (same), DN-982 (same), DN-983 (same), PC-8000 (PPG Corp. (US)), and the like.

As the above-mentioned diamines there are, for example, ethylenediamine, tetramethylenediamine, hexamethylene-diamine, p-phenylenediamine, 4,4'-diaminodiphenyl-methane, diamines including hetero atoms, and diamines with a polyoxylene structure, and the like.

Examples of diisocyanates used in the above manufacturing methods 1 to 3 are 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, hexamethylene diisocyanate, isophorone diisocyanate, dicyclohexylmethane diisocyanate, methylene bis(4-cyclohexyldiisocyanate), hydrogenated diphenylmethane diisocyanate, 2,2,4-trimethylhexamethylene diisocyanate, bis(2-isocyanatoethyl) fumarate, 6-isopropyl-1,3-phenyl diisocyanate, 4-diphenylpropane diisocyanate, lysine diisocyanate, and the like.

Examples of (meth)acrylates with a hydroxyl group used in the above manufacturing methods 1 to 3 are, for example, hydroxyalkyl(meth)acrylates such as 2-hydroxyethyl(meth)acrylate, 2-hydroxypropyl(meth)acrylate, and the like; polyethylene glycol mono(meth)acrylate, polypropylene glycol mono(meth)acrylate, trimethylolpropane di(meth)acrylate, trimethylolethane di(meth)acrylate, pentaerythritoltri(meth)acrylate, dipentaerythritolpenta(meth)acrylate, 1,4-butanediolmono(meth)acrylate, 4-hydroxycyclohexyl(meth)acrylate, 1,6-hexanediolmono(meth)acrylate, neopentylglycolmono(meth)acrylate, glycerine di(meth)acrylate, (meth)acrylates represented by the formulae given below, and the like; as well as compounds compounds obtained by an addition reaction with (meth)acrylic acid and a glycidyl group-containing compound such as alkyl glycidyl ether, aryl glycidyl ether, glycidyl (meth)acrylate, and the like.

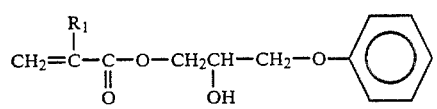

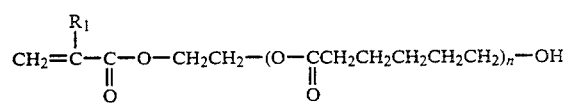

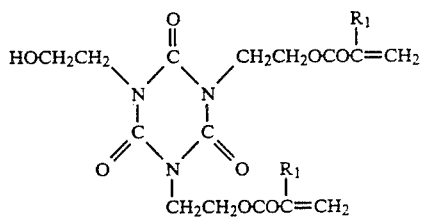

(where $R_1$ is H or $CH_3$, and n is an integer from 1 to 5).

Examples of compounds having a (meth)acryloyl group and an isocyanate group in the same molecule, used in the above-mentioned manufacturing method 4 are compounds represented by the following formula:

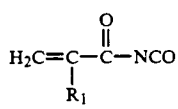

(where $R_1$ is H or $CH_3$).

An embodiment of carrying out the above-mentioned manufacturing method 1 will now be outlined.

About 0.5 to 2 mols of diisocyanate are used for each hydroxyl group of a diol having a polyoxyalkylene structure. Generally, in this reaction, 0.01 to 1 part by weight of a catalyst such as copper naphthenate, cobalt naphthenate, zinc naphthenate, dibutyltin dilauryate, triethylamine, or the like is used for the total weight of 100 parts by weight of the reactant raw materials. The reaction temperature is normally in the range of 0° to 80° C.

About one mol of the (meth)acrylate with a hydroxyl group is used for each isocyanate group of the intermediate obtained in this manner. The reaction conditions are the same as in producing the above-mentioned intermediate.

An embodiment of carrying out the above-mentioned manufacturing method 2 will now be outlined.

About 0.5 to 2 mols of (meth)acrylate with a hydroxyl group are used for one mol of diisocyanate under the same reaction conditions as for the manufacturing method 1 to produce an addition compound. For each isocyanate group of the addition compound thus obtained, about one hydroxyl group of a diol with a polyoxyalkylene structure is used. The reaction conditions are the same as in the manufacturing method 1.

An embodiment of carrying out the above-mentioned manufacturing method 3 will now be outlined.

0.5 to 2 mols of diisocyanate are used for each hydroxyl group of a diol with a polyoxyalkylene structure.

In addition, the amount of the (meth)acrylate with a hydroxyl group is such that 0.9 to 1.1 times the equivalent weight of the total hydroxyl groups of the (meth)acrylate and the hydroxyl groups of the diol with the polyoxyalkylene structure are used for one part by weight of diisocyanate.

However, in the manufacturing methods 1 and 2, the amount of the (meth)acrylate compound with the hydroxyl group, in the case where a (meth)acrylate compound with two or more hydroxyl in one molecule is used, must be an amount obtained by dividing the above-mentioned amount by the number of the hydroxyl groups in one molecule.

An embodiment of carrying out the above-mentioned manufacturing method 4 will now be outlined.

The amount used of the compound having a (meth)acryloyl and an isocyanate group in the same molecule is such that the weight of the isocyanate group is 0.9 to 1.1 times the weight of the hydroxyl groups of the diol with a polyoxyalkylene structure.

In the case where, at the time carrying out the manufacturing methods 1 to 3, part of the diol with a polyoxyalkylene structure is replaced by a diol or a diamine without a polyoxyalkylene structure, about 0.5 to 2 mols of diisocyanate are used for one equivalent of the hydroxyl group plus amino group contained in the diol with and without a polyoxyalkylene structure and also in the diamine.

Furthermore, at the time of carrying out the manufacturing methods 1 to 3, a polyol other than a bifunctional one, a polyamine other than a bifunctional amine, or a polyisocyanate other than a bifunctional isocyanate can be used together to the extent that the product is not gelled. Normally, the amount of these polyfunctional compounds used together is 5 to 30 parts by weight for 100 parts by weight of the diol, diamine, or diisocyanate. Hero, as a polyol other than a bifunctional polyol it is possible to use, for example, an addition product glycerine and propylene oxide, glycerine, 1,2,3-pentanetriol, 1,2,3-butanetriol, tri(2-hydroxypolyoxypropyl)polysiloxane, polycaprolactonetriol, polycaprolactonetetraol, liquid polybutadiene with more than two hydroxyl groups in one molecule or its hydrogenated product, or the like. As a polyamine other than a bifunctional amine it is possible to use, for example, diethylenetriamine, 1,2,3-triaminopropane, polyoxypropyleneamine, and the like. As a polyisocyanate other than a bifunctional isocyanate it is possible to use, for example, polymethylene polyphenylisocyanate, triphenylmethane 4,4′,4″-triisocyanate, and the like.

In the present invention, the urethane (meth)acrylate (a) normally contains 0.8 to 8 wt% of an unsaturated ethylene group, and preferably 1 to 5 wt %. The number average molecular weight of 1,000 to 7,000 is desirable, with the range of 1,500 to 5,000 being particularly desirable. When the number average molecular weight of the urethane (meth)acrylate (a) is less than 1,000, the breaking elongation of the resulting cured composition is reduced, and the tenacity shows a tendency to drop. The Young's modulus at low temperature tends to be increased. If the number average molecular weight exceeds 7,000, the viscosity of the composition becomes high and handling becomes difficult. In addition, it is desirable that the percentage of the polyoxyalkylene structure in the urethane (meth)acrylate (a) be in the 50 to 98 wt % range, with a particularly desirable range being 60 to 93 wt %, and the most desirable 70 to 90 wt %. If the percentage of the polyoxyalkylene structure in the urethane (meth)acrylate (a) is less than 50 wt %, the Young's modulus of the cured product at low temperature tends to be elevated. In the case where the composition is used as covering material for optical fiber this can be the cause of transmission losses.

A polyoxytetramethylene structure is particularly desirable as the polyoxyalkylene structure in the urethane (meth)acrylate (a). Accordingly, polytetramethylene glycol or a copolymerized diol of tetrahydrofuran and 3-methyltetrahydrofuran are suitable as the diols used in the manufacture of the urethane (meth)acrylate (a).

In the same way, 2,4-toluenediisocyanate, isophorondiisocyanate, hydrogenated bisphenol A diisocyanate, 2,2,4-trimethylhexamethylenediisocyanate, and, in particular, isophorondiisocyanate, are desirable as the diisocyanate.

In the same way, hydroxyethylacrylate, hydroxypropyl-acrylate, hydroxybutylacrylate, or an acrylate represented by the following formula are desirable as the (meth)acrylate with a hydroxyl group.

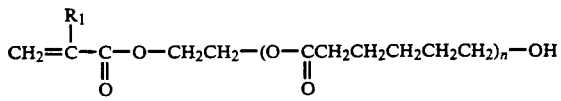

(where $R_1$ is H or $CH_3$, and n is an integer from 1 to 5).

The urethane (meth)acrylate (a) described above should be blended into the composition of the present invention at 14 to 70 wt %. A particularly desirable range is 16 to 60 wt %. If the amount of the urethane (meth)acrylate (a) is less than 14 wt %, the breaking elongation of the resulting cured composition is reduced. If the amount exceeds 70 wt %, the Young's modulus of the cured material is reduced at close to room temperature and the viscosity of the composition is elevated, which tends to result in poor handling characteristics.

The manufacturing methods for the urethane (meth)acrylate with a tricyclodecane structure, which is the (b) component of the composition of the present invention (hereinafter referred to as urethane (meth)acrylate (b)), differs from the manufacturing methods 1 to 4 for the urethane (meth)acrylate (a) inasmuch as a diol with a tricyclodecane structure is substituted for the diol with a polyoxyalkylene structure.

Examples which can be given for the diol with a tricyclodecane structure used in these methods include tricyclodecane dialcohols, such as tricyclodecane dimethanol, tricyclodecane diethanol, and the like; ε-caprolactone addition product diols of tricyclodecane dialcohols; polyalkylene oxide addition product diols of tricyclodecane diethanol; and the like.

In addition, the same diisocyanates and (meth)acrylates with a hydroxyl group as used to manufacture the urethane (meth)acrylate (a) can be used here.

Also, as embodiments for the manufacture of the urethane (meth)acrylate (b), the manufacturing methods 1 to 4 of the urethane (meth)acrylate (a) are given, provided that the diol with a polyoxyalkylene structure used in these methods is substituted with a diol with a tricyclodecane structure.

Further, when the urethane (meth)acrylate (b) is being manufactured, the diol represented by the following formula can be substituted for part of the diol with a tricyclodecane structure.

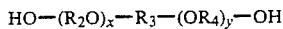

(where $R_2$ and $R_4$ may be the same or different, and represent

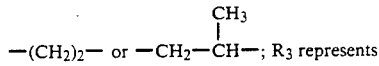

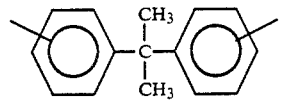

or

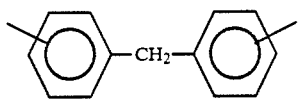

x and y are average values and are respectively numbers which satisfy $1 \leq x \leq 15$ and $1 \leq y \leq 15$.)

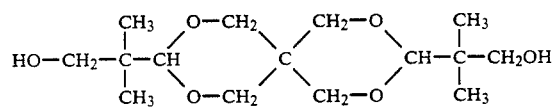

The urethane (meth)acrylate (b) normally contains 1.3 to 8 wt % of an ethylenically unsaturated group, and preferably contains 2 to 7 wt %. This compound has desirably a number average molecular weight of 500 to 1,000, with the ideal range being 700 to 900. If the number average molecular weight of the urethane (meth)acrylate (b) is below 500, the solubility of this compound into the reactive diluent (c), which will be later explained, becomes poor, and if the number average molecular weight of the urethane (meth)acrylate (b) exceeds 1,000, the viscosity of the composition is elevated, resulting in poor handling characteristics. The percentage of the tricyclodecane structure of the urethane (meth)acrylate (b) is desirably 15 wt % or greater. An ideal percentage is 20 wt % or greater. If the percentage of the tricyclodecane structure of the urethane (meth)acrylate (b) is less than 15 wt % the tenacity of the resulting cured material is adversely affected.

As the diol with the tricyclodecane structure, tricyclodecane dimethanol is the most desirable. Examples of the desirable diisocyanate and of the compound with a hydroxyl group are the same as for the urethane (meth)acrylate (a).

The urethane (meth)acrylate (b) described above is blended into the composition of the present invention at 5 to 40 wt %. A particularly desirable range is 10 to 35 wt %. If the amount of the urethane (meth)acrylate (b) is less than 5 wt %, the tenacity of the resulting cured composition is adversely affected. If the amount exceeds 40 wt %, the viscosity of the cured material is elevated, which tends to result in poor handling characteristics.

The urethane (meth)acrylate (a) and (b) of the present invention, as has already been explained, can be manufactured separately. However, it is possible to manufacture the urethane (meth)acrylate (a) and (b) simultaneously using the following manufacturing methods 5 to 8.

Manufacturing method 5

This is a method by which a diol with a polyoxyalkylene structure and a diol with a tricyclodecane structure are reacted with a diisocyanate, either one after the other or mixed together, and the isocyanate group of the intermediate which is thus obtained is then reacted with a (meth)acrylate containing a hydroxyl group.

Manufacturing method 6

This is a method by which a diol with a polyoxyalkylene structure and a diol with a tricyclodecane structure are reacted, either one after the other or mixed together, with the isocyanate group of the addition compound obtained by reacting a diisocyanate with a (meth)acrylate containing a hydroxyl group.

Manufacturing method 7

This is a method by which a diisocyanate, a diol with a polyoxyalkylene structure, a diol with a tricyclodecane structure, and a (meth)acrylate with a hydroxyl group are reacted simultaneously.

Manufacturing method 8

This is a method by which a compound with a (meth)acryloyl group and an isocyanate group in the same molecule, a diol with a polyoxyalkylene structure, and a diol with a tricyclodecane structure are reacted, either one after the other or mixed together.

The above-mentioned manufacturing methods 5 to 8 can be implemented in the same way as in the case of the various preferred methods 1 to 3 for manufacturing the urethane (meth)acrylate (a).

In the composition of the present invention, prepolymers other than the above-mentioned urethane (meth)acrylate (a) and (b) can be used in common in a range which does not have an adverse effect on the present invention.

Examples of prepolymers other than the above-mentioned urethane (meth)acrylate (a) and (b) which can be given are prepolymers obtained by reacting compounds selected from among polycaprolactone diol, polycarbonate diol, polyester diol, and diamines, with the previously mentioned diisocyanates and (meth)acrylates with a hydroxyl group.

Examples of prepolymers other than the above-mentioned urethane (meth)acrylates (a) and (b) which can also be given are polymerized compounds formed by a urethanizing reaction of a polyisocyanate and a (meth)acrylate containing a hydroxyl group. Specific examples of this type of polymerized compound are the urethanizing reaction product of toluene diisocyanate and 2-hydroxyethyl(meth)acrylate (mol ratio 1:2), the urethanizing reaction product of diphenylmethane diisocyanate and 2-hydroxyethyl(meth)acrylate (mol ratio 1:2), and the urethanizing reaction product of isophorone diisocyanate and 2-hydroxyethyl(meth)acrylate (mol ratio 1:2).

For the reactive diluent which is the (c) component of the present invention both monofunctional compounds and multifunctional compounds can be used. In the case where a cured compound with a comparatively low elastic modulus is desired, a monofunctional compound is mainly used. However, by using suitable percentages of a monofunctional compound and a multifunctional compound in common it is possible to adjust the elastic modulus of the cured material. There is no particular restriction on these monofunctional and multifunctional compounds. Examples of these compounds are as follows.

Monofunctional compounds : N-vinyl pyrrolidone, N-vinyl-ε-caprolactam, 2-hydroxyethyl(meth)acrylate, 2-hydroxypropyl(meth)acrylate, tetrahydro furfuryl(meth)acrylate, butoxyethyl(meth)acrylate, ethyldiethylene glycol(meth)acrylate, 2-ethylhexyl(meth)acrylate, cyclohexyl(meth)acrylate, phenoxyethyl(meth)acrylate, polyethyleneglycol(meth)acrylate, (meth)acrylate, polypropylene glycol(meth)acrylate, methyltriethylene diglycol(meth)acrylate, isobornyl(meth)acrylate, diacetone(meth)acrylamide, isobutoxy-methyl(meth)acrylamide, N,N-dimethyl(meth)acrylamide, t-octyl(meth)acrylamide, dimethylaminoethyl(meth)acrylate, diethylaminoethyl(meth)acrylate, (meth)acryloylmorpholine, dicyclopentenyl(meth)acrylate, tricyclodecanyl(meth)acrylate, and the compounds represented by the following formulae.

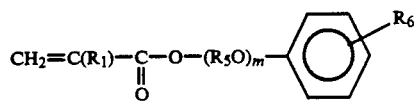

(where $R_1$ has the same meaning as previously described, $R_5$ is an alkylene group with 2 to 6 carbon atoms and preferably 2 to 4 carbon atoms, $R_6$ is a hydrogen atom or an alkyl group with 1 to 12 carbon atoms, and m is an integer from 0 to 12.)

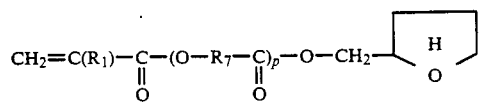

(where $R_1$ has the same meaning as previously described, $R_7$ is an alkylene group with 2 to 8 carbon atoms, and p is an integer from 1 to 8.)

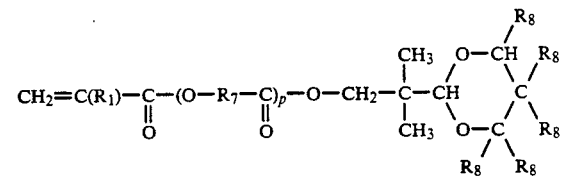

(where $R_1$, $R_7$, and p have the same meaning as previously described, $R_8$ is a hydrogen atom or a methyl group.) ARONIX M111 (manufactured by Toagosei Chemical Industry Co., Ltd.), M113 (same), M114 (same), M117 (same), KAYARAD TC110S (manufactured by Nippon Kayaku Co., Ltd.), R629 (same), R644 (same), and VISCOAT 3700 (manufactured by Osaka Organic Chemical Industry Ltd.).

Multifunctional compounds : trimethylolpropane tri(meth)acrylate, pentaerythritol tri(meth)acrylate, ethyleneglycol di(meth)acrylate, tetraethyleneglycol di(meth)acrylate, polyethyleneglycol di(meth)acrylate, 1,4-butanediol di(meth)acrylate, 1,6-hexanediol di(meth)acrylate, neopentylglycol di(meth)acrylate, trimethylolpropane trioxyethyl(meth)acrylate, tricyclodecane dimethanol di(meth)acrylate, dicyclopentanediene di(meth)acrylate, dicyclopentane di(meth)acrylate, tris(2-hydroxyethyl)isocyanurate tri(meth)acrylate, tris(2-hydroxyethyl)isocyanurate di(meth)acrylate, and epoxy(meth)acrylate which is a (meth)acrylate addition compound of bisphenol A diglycidil ether, YUPIMA-UV SA1002 (manufactured by Mitsubishi Petrochemical Co., Ltd.), SA2007 (same), VISCOA T 700 (manufactured by Osaka Organic Chemical Industry Ltd.), KAYARAD R-604 (manufactured by Nippon Kayaku Co., Ltd.), DPCA-20 (same), DPCA-30 (same), DPCA-60 (same), DPCA-120 (same), HX-620 (same), D-310 (same), D-330 (same), ARONIX M210 (manufactured by Toagosei Chemical Industry Co., Ltd.), M-215 (same), M-315 (same), M-325 (same).

It is desirable that the component (c) used in the present invention contain a type of N-vinyllactam such as N-vinylpyrrolidone, N-vinyl-ε-caprolactam, and the like. In the case where such a type of N-vinyllactam is used, it should be used in the range of 3 to 20 wt % of the composition, and, preferably, in the range of 5 to 15 wt %.

Furthermore, using an ethylene-type unsaturated monomer with an alicyclic structure as the component (c) further improves the characteristics of the cured material with respect to water resistance, hot water resistance, oxidation resistance, alkali resistance, and the like, which is desirable in improving its long term reliability. Examples of such an ethylene-type unsaturated monomer with an alicyclic structure which can be given are isobornyl (meth)acrylate, dicyclopentyl (meth)acrylate, tricyclodecanyl (meth)acrylate, cyclohexyl (meth)acrylate, tricyclodecane dimethanol di(meth)acrylate, and the like. Among these, isobornyl (meth)acrylate and tricyclodecane dimethanol di(meth-)acrylate are particularly suitable.

The component (c) may be blended into the composition of the present invention at 20 to 70 wt %. A particularly effective range is 25 to 60 wt %.

There are no particular limitations on the type of polymerization initiator used as the component (d) of the composition of the present invention. For example, the following may be used : 1-hydroxycyclohexylphenyl ketone, 2,2-dimethoxy-2-phenylacetophenone, acetophenone, benzophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michiler's ketone, benzoine propyl ether, benzoine ethyl ether, benzyl dimethyl ketal, 1-(4-isopropylphenyl)-2-hydroxy-2-methylpropane-1-on, 2-hydroxy-2-methyl-1-phenylpropane-1-on, thioxanton-type compounds, 2-methyl-1-[4-(methylthio)phenyl]-2-morpholino-propane-1-on, 2,4,6-trimethylbenzoyldiphenyl-phosphine oxide, and the like. Particularly desirable are photopolymerization initiators such as 1-hydroxycyclohexylphenyl ketone, benzyldimethyl ketanol, 2-methyl-1-[4-(methylthio)phenyl]-2-morpholino-propane-1-on, 2,4,6-trimethylbenzoyldiphenylphosphine oxide, and the like.

These photopolymerization initiators can be used singly or in combinations of two or more, and if necessary, they can be used in common with amine-type sensitizers (photopolymerization promoters) in a range where the effect of the present invention is not inhibited. In addition, other than photopolymerization initiators, thermal polymerization initiators can also be used.

The above-mentioned component (d) is usually used at 0.1 to 10 wt %, and preferably at 1 to 5 wt %.

In addition, in the composition of the present invention, as additives other than the components (a) to (d), epoxy resins, polyamides, polyamideimides, polyurethates, polybutadienes, chloroprenes, polyethers, polyesters, pentadiene derivatives, styrene/butadiene /styrene block copolymers, styrene/ethylene /butylene/styrene block copolymers, styrene/isoprene /styrene block copolymers, petroleum resins, xylene resins, ketone resins, fluorine-type oligomers, silicone-type oligomers, polysulfide-type oligomers, and the like may be blended in. In addition, antioxidants, colorants, ultraviolet absorbants, silane coupling agents, thermopolymerization inhibitors, leveling agents, preservatives, plasticizers, lubricants, solvents, fillers, anti-aging agents, wettability improvement agents, painted surface improvement agents, and the like may be blended in.

The composition of the present invention prepared in this manner normally has a viscosity of 1,000 to 20,000 cp/25° C., and preferably 2,000 to 10,000 cp/25° C. The Young's modulus of the material after curing is normally 10 to 90 kg/mm$^2$.

EXAMPLES

The composition of the present invention will now be explained in more detail with reference to the following examples which are representative but not restrictive of the present invention.

SYNTHESIS EXAMPLE 1

720 grams of tricyclodecane dimethanol diacrylate (YUPIMER-UV SA1002 manufactured by Mitsubishi Petrochemical Co., Ltd), 1,144 grams of isophorone diisocyanate, 4 grams of dibutyltin dilaurate, 0.4 gm of phenothiazine, and one gram of 2,6-di-t-butyl-4-methylphenol were placed in a reaction vessel. While the reaction vessel was being cooled with icewater to prevent the internal temperature from exceeding 20° C., 863 gm of hydroxyethyl acrylate were added to the vessel with stirring. After the addition was completed the internal temperature of the reaction vessel was maintained at 5° to 20° C. while the stirring proceeded continuously for one hour. The internal temperature of the contents of the vessel was then maintained below 50° C. while 160 gm of tricyclodecane dimethanol was added with stirring. After the addition was completed the contents of the vessel were maintained at 40° to 50° C. while being continuously stirred for one hour, after which 1,835 gm of polytetramethylene glycol (PTG3000 manufactured by Hodogaya Chemical Co., Ltd.) with a number average molecular weight of 3,000 was added with continuous stirring, with the temperature being maintained between 40° to 50° C. until the residual isocyanate dropped below 0.1 wt %.

The resulting urethane acrylate solution was designated as PU-1. The ratio by weight of urethane acrylate and tricyclodecane dimethanol diacrylate in the PU-1 was 100:18.

SYNTHESIS EXAMPLE 2

720 grams of tricyclodecane dimethanol diacrylate, 1,255 grams of isophorone diisocyanate, 4 grams of dibutyltin dilaurate, 0.4 gm of phenothiazine, and one gram of 2,6-di-t-butyl-4-methylphenol were placed in a reaction vessel. While the reaction vessel was being cooled with icewater to prevent the internal temperature from exceeding 20° C., 921 gm of hydroxyethyl acrylate was added to the vessel with stirring. After the addition was completed the internal temperature of the reaction vessel was maintained at 5° to 20° C. while the stirring proceeded continuously for one hour. The internal temperature of the contents of the vessel was then maintained below 50° C. while 160 gm of tricyclodecane dimethanol was added with stirring. After tho addition was completed the contents of the vessel were maintained at 40° to 50° C. while being continuously stirred for one hour, after which 1,725 gm of polytetramethylene glycol (PTMG2000 manufactured by Mitsubishi Chemical Industries, Ltd.) with a number average molecular weight of 2,000 was added with continuous stirring, with the temperature being maintained between 40° to 50° C. until the residual isocyanate dropped below 0.1 wt %.

The resulting urethane acrylate solution was designated as PU-2. The ratio by weight of urethane acrylate and tricyclodecane dimethanol diacrylate in the PU-2 was 100:17.7.

SYNTHESIS EXAMPLE 3

1,377 grams of tricyclodecane dimethanol diacrylate, 2,310 grams of isophorone diisocyanate, 7 grams of dibutyltin dilaurate, 0.7 gm of phenothiazine, and 2 grams of 2,6-di-t-butyl-4-methylphenol were placed in a reaction vessel. While the reaction vessel was being cooled with icewater to prevent the internal temperature from exceeding 20° C., 1,658 gm of hydroxyethylacrylate were added to the vessel with stirring agitation. After the addition was completed the internal temperature of the reaction vessel was maintained at 5° to 20° C. while the stirring proceeded continuously for one hour. The internal temperature of the contents of the vessel was then maintained below 50° C. while 386 gm of tricyclodecane dimethanol was added with stirring. After the addition was completed the contents of the vessel were maintained at 40° to 50° C. while being continuously stirred for one hour, after which 2,288 gm of polytetramethylene glycol (PTMG2000 manufactured by Mitsubishi Chemical Industries, Ltd.) with a number average molecular weight of 2,000 and 256 gm of a copolymer diol of propylene oxide and tetrahydrofuran (PPTG2000 manufactured by Hodogaya Chemical Co., Ltd.) with a number average molecular weight of 2,000 were added in order, with continuous stirring, with the temperature being maintained between 40° to 50° C. until the residual isocyanate dropped below 0.1 wt %.

The resulting urethane acrylate solution was designated as PU-3. The ratio by weight of urethane acrylate and tricyclodecane methanol diacrylate in the PU-3 was 100:20.

EXAMPLES 1 to 3

Compositions were obtained by mixing the components shown in Table 1 and agitating for 3 hours at 40° to 50° C.

TABLE 1

|  | Example 1 | Example 2 | Example 3 (wt %) |
|---|---|---|---|
| Urethane acrylate oligomer solution |  |  |  |
| PU-1 | 788 |  |  |
| PU-2 |  | 798 |  |
| PU-3 |  |  | 812 |
| N-vinyllactam |  |  |  |
| N-vinylpyrrolidone | 81 | 81 | 91 |
| (Meth)acryl ester |  |  |  |
| Isobornyl acrylate | 88 | 68 | 79 |
| Tricyclodecane-dimethanoldiacrylate | 25 | 35 | — |
| Photopolymerization Initiator |  |  |  |
| IRGACURE 184 *1 |  |  | 10 |
| IRGACURE 907 *2 | 5 | 5 | 5 |
| LUCIRIN LR8728 *3 | 10 | 10 |  |
| Antioxidant |  |  |  |
| IRGANOX 1035 *4 | 3 |  | 3 |
| TINUVIN 770 *5 |  | 1.5 |  |
| IRGANOX 1076 *6 |  | 1.5 |  |
| Viscosity (25° C., cps) | 7,000 | 5,800 | 4,500 |

*1 IRGACURE 184 (manufactured by Ciba-Geigy) 1-hydroxycyclohexylphenyl ketone
*2 IRGACURE 907 (manufactured by Ciba-Geigy) 2-methyl-1-[4-(methylthio)-phenyl]-2-morpholinopropane-1-on
*3 LUCIRIN LR8728 (manufactured by BASF) 2,4,6-trimethylbenzoyldiphenyl-phosphine oxide
*4 IRGANOX 1035 (manufactured by Ciba-Geigy) 2,2-thiodiethylene bis[3-(3,5-di-t-butyl-4-hydroxyphenyl)propionate]
*5 TINUVIN 770 (manufactured by Ciba-Geigy) bis(2,2,6,6-tetramethyl-4-piperydil)sebacate
*6 IRGANOX 1076 (manufactured by Ciba-Geigy) octadecyl-3-(3,5-di-t-butyl-4-hydroxyphenyl) propionate

TEST EXAMPLE

Compositions prepared from each of the EXAMPLES were applied to optical fiber using an optical fiber drawing device, varying the speed at which the optical fiber was drawn. These compositions were cured by exposure to ultraviolet light and covered optical fiber was obtained.

The average diameter of the optical fiber which was the core of this covered fiber was about 125 μm and the outer diameter of the covered optical fiber was 210 μm.

Measurement of gel ratio

The covered optical fiber was cut into 4 cm lengths. These pieces were weighed and the lengths recorded as the initial weight $W_o$. The pieces were then extracted with methyl ethyl ketone for 12 hours using a Sohxlet extraction device.

After extraction the covered optical fiber was dried at 50° C. for 12 hours in a vacuum oven. After drying, the samples were allowed to stand for 1 hour at room temperature and were again weighed. (This weight was designated as the dried weight $W_1$).

The covered fiber samples were then calcined in an electric oven at 700° C. for 30 minutes, the covering was removed, and the optical fiber only was recovered and weighed. (The weight of the optical fiber was designated as $W_f$).

The gel ratio of the optical fiber covering layer was then calculated according to the following equation.

$$\text{Gel ratio} = \frac{W_1 - W_f}{W_o - W_f}$$

Measurement of tensile properties

The optical fiber (core) was removed from the covered optical fiber using an optical fiber stripper (FITELS-21 manufactured by Furukawa Electric Industries Co., Ltd.) to obtain the empty covering, which was then cut into 1 cm lengths. Adhesive was then applied to the ends of the empty covering pieces and these pieces were caused to adhere to metal fittings so that the empty covering pieces stood perpendicular to the level surfaces of the metal fittings. Next, the empty covering pieces adhering to the metal fittings were inserted into the chuck of a tension test machine and subjected to tension testing. In the tension test, the values for the Young's modulus were obtained at a drawing speed of 1 mm/min. The values for breaking elongation and fracture stress were obtained at a drawing speed of 50 cm/min. The results are shown in Table 2.

TABLE 2

|  | at drawing speed | Ex.1 | Ex.2 | Ex.3 |
|---|---|---|---|---|
| Gel Ratio (%) | 100 m/min | 97 | 97 | 96 |
|  | 200 m/min | 97 | 97 | 96 |
|  | 400 m/min | 97 | 97 | 96 |
|  | 600 m/min | 97 | 97 | 95 |
| Youngs Modulus (kg/mm$^2$) | 100 m/min | 70 | 80 | 90 |
|  | 200 m/min | 68 | 78 | 88 |
|  | 400 m/min | 65 | 75 | 82 |
|  | 600 m/min | 63 | 72 | 75 |
| Breaking Strength (kg/mm$^2$) | 100 m/min | 5.0 | 5.2 | 5.5 |
|  | 200 m/min | 5.0 | 5.2 | 5.4 |
|  | 400 m/min | 4.9 | 5.0 | 5.2 |
|  | 600 m/min | 4.7 | 4.8 | 5.0 |
| Breaking Elongation (%) | 100 m/min | 60 | 55 | 50 |
|  | 200 m/min | 62 | 55 | 51 |
|  | 400 m/min | 65 | 58 | 54 |
|  | 600 m/min | 65 | 58 | 56 |

Effect of the Invention

The composition of the present invention has a low viscosity and can be cured at a high speed providing a cured product with high tenacity. It is therefore a superior material for use as the hard material or bundling material for optical fiber.

What is claimed is:

1. A liquid photocurable plastic composition comprising:
   (a) from 14% to 70% by weight of a polyurethane (meth)acrylate having a polyoxyalkylene structure in the backbone of the polyurethane, said polyurethane (meth)acrylate containing 0.8 to 8 weight percent of ethylenic unsaturation, from 50% to 98% by weight of the polyoxyalkylene structure, and having a number average molecular weight of 1,000 to 7,000;
   (b) from 5% to 40% by weight of a polyurethane (meth)acrylate having at least 15% by weight of a tricyclodecane structure in the backbone of the polyurethane and a number average molecular weight of from 500 to 1,000;
   (c) a reactive diluent; and
   (d) a polymerization initiator.

2. A photocurable composition as recited in claim 1 in which said polyoxyalkylene structure is provided by a polyoxytetramethylene structure.

3. A photocurable composition as recited in claim 2 in which said polyoxytetramethylene structure is provided by a copolymerized diol of tetrahydrofuran and 3-methyl tetrahydrofuran.

4. A photocurable composition as recited in claim 1 in which said polyurethane (meth)acrylate having a polyoxyalkylene structure is made by the reaction of components comprising an organic diisocyanate, a diol having the polyoxyalkylene structure and an acrylate having a single hydroxy group.

5. A photocurable composition as recited in claim 4 in which said acrylate having a single hydroxy group is provided by 2-hydroxyethyl acrylate.

6. A photocurable composition as recited in claim 1 in which said polyurethane (meth)acrylate is present in an amount of from 16% to 70% and contains 1 to 5 weight percent of ethylenic unsaturation, from 60% to 93% by weight of the polyoxyalkylene structure, and has a number average molecular weight of 1,500 to 5,000.

7. A photocurable composition as recited in claim 6 in which from 70% to 90% by weight of the polyoxyalkylene structure is present.

8. A photocurable composition as recited in claim 1 in which said polyurethane (meth)acrylate having a tricyclodecane structure is present in an amount of from 10% to 35% and has at least 20% by weight of said tricyclodecane structure and a number average molecular weight of from 700 to 900.

9. A photocurable composition as recited in claim 1 in which said polyurethane (meth)acrylate having a tricyclodecane structure is based on tricyclodecane dimethanol.

10. A photocurable composition as recited in claim 1 in which said component (c) comprises an N-vinyl lactam.

* * * * *

UNITED STATES PATENT AND TRADEMARK OFFICE
CERTIFICATE OF CORRECTION

PATENT NO. : 5,093,386  Page 1 of 2
DATED : March 3, 1992
INVENTOR(S) : Bishop et al.

It is certified that error appears in the above-identified patent and that said Letters Patent is hereby corrected as shown below:

Column 2, line 29  "; an" should be --; and--.

Column 3, line 57  "wolyesterdiols" should be --polyesterdiols--

Column 4, line 37  Delete second occurrence of "compounds".
Column 6, line 6   "Hero" should be --Here--.

Column 8, line 3   "to900" should be --to 900--.

Column 9, line 21  "tho" should be --the--.

Column 9, line 22  "tolueno" should be --toluene--.

Column 9, line 51  "isobutoxy-methyl" should be --isobutoxymethyl--. (Patent Office error)
Column 10, line 40 "diglycidil" should be --diglycidyl--.
Column 11, line 39 "thates," should be --thanes,--. (Patent Office error)
Column 12, line 40 "tho" should be --the--. (Patent Office

UNITED STATES PATENT AND TRADEMARK OFFICE
CERTIFICATE OF CORRECTION

PATENT NO.   : 5,093,386

DATED        : March 3, 1992

INVENTOR(S)  : Timothy E. Bishop

It is certified that error appears in the above-identified patent and that said Letters Patent is hereby corrected as shown below:

Column 13, Table I "(wt %)" should be on same line with "TABLE I".

Signed and Sealed this

Sixth Day of July, 1993

Attest:

MICHAEL K. KIRK

Attesting Officer

Acting Commissioner of Patents and Trademarks